Nov. 26, 1946.    R. PLACE    2,411,694
CONTINUOUS CAMERA OR PRINTER
Filed July 17, 1942    2 Sheets-Sheet 2

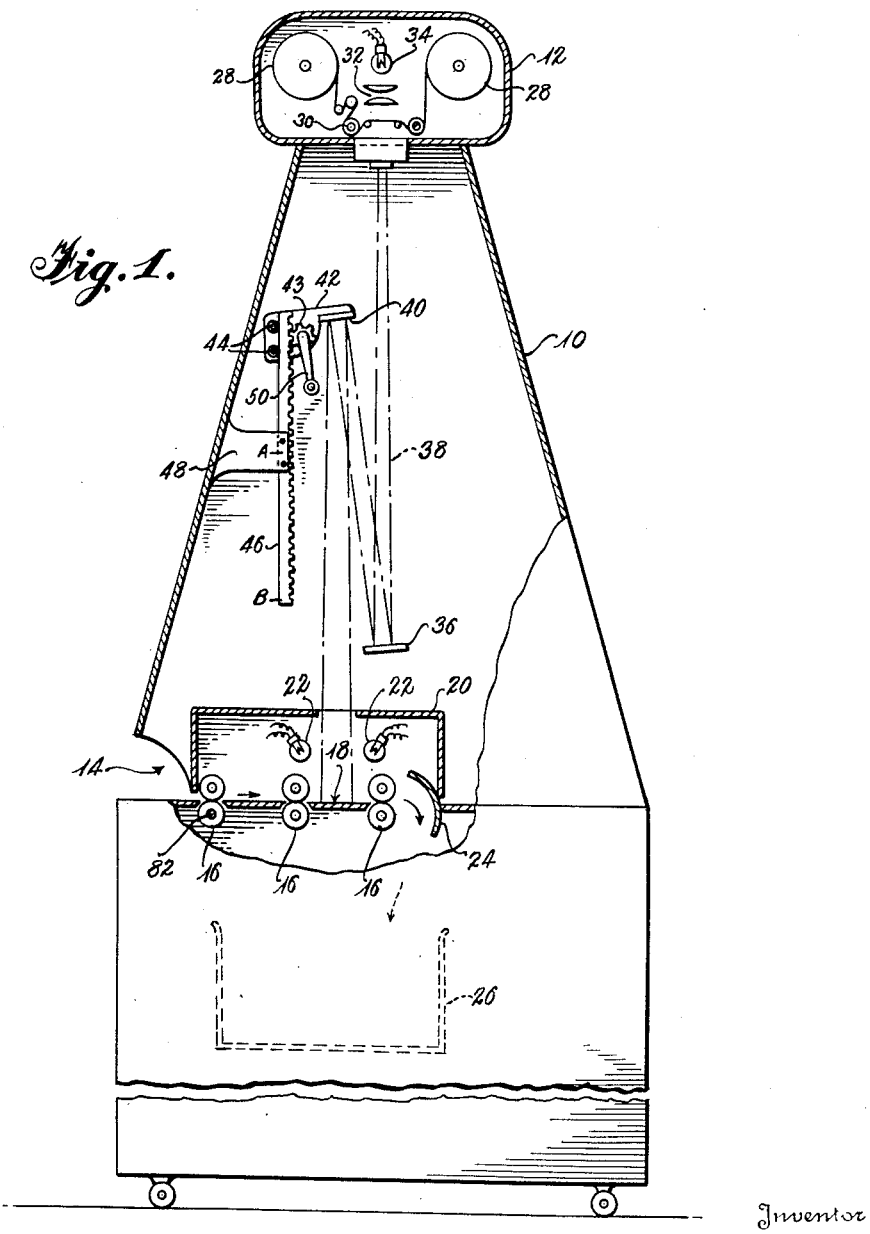

Inventor
Robert Place
By
Attorney

Patented Nov. 26, 1946

2,411,694

UNITED STATES PATENT OFFICE 2,411,694

CONTINUOUS CAMERA OR PRINTER

Robert Place, Waltham, Mass., assignor to Graphic Microfilm Service, Inc., Waltham, Mass., a corporation of Massachusetts Application July 17, 1942, Serial No. 451,329

2 Claims. (Cl. 88—24)

This invention relates to improvements in cameras or printers and may conveniently be embodied in a combined continuous camera and printer. The principles of the invention are particularly applicable to continuously operated microfilm cameras and/or printers.

The invention has for its principal objects the multiple magnification with a single lens and fixed camera height together with synchronization of lens reduction to film movement whereby manuscripts of various sizes may be photographed or enlargements produced at various reduction ratios.

The invention contemplates in general the adjustment of lens ratio with a given gear ratio and, as such, avoids the difficulties heretofore encountered in attempts to provide a gear ratio in synchronism with a given lens ratio.

Among other objects of the invention is to enable the use of a long focal length lens at relatively close range. The use of a long range lens is of particular advantage in microfilming in view of its greater area of high resolving power.

In the particular embodiment of the invention herein described and illustrated a reflector system is interposed between the camera and manuscript feed bed in the case of photographing and between the printer and feed bed for the sensitized paper in the case of printing.

In the accompanying drawings:

Figure 1 is a side elevational view partly broken away to show the internal working mechanism and illustrating the image reflecting mirrors in one selected position;

Figure 4:
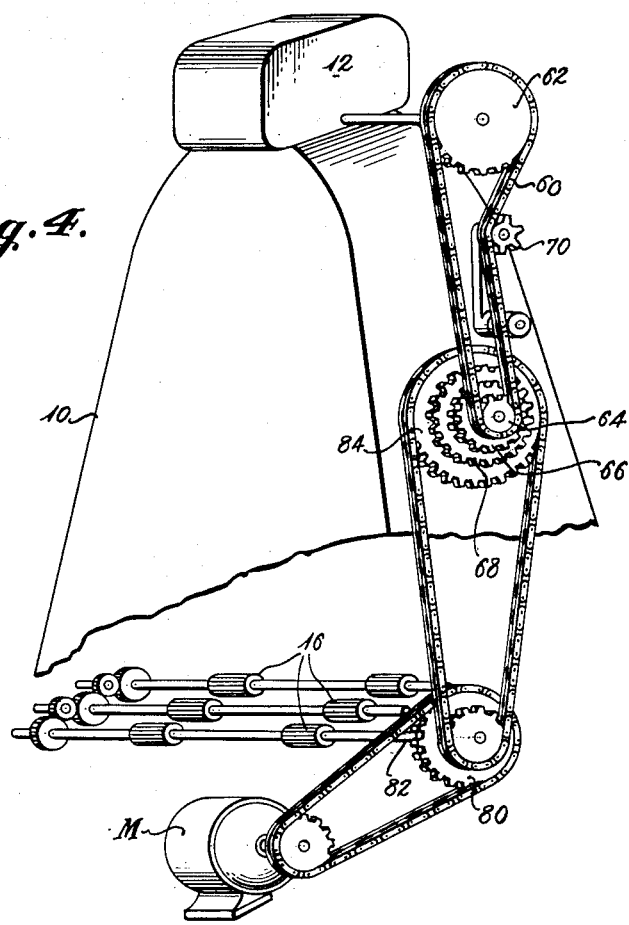
Fig. 4 is a perspective view of the device of Fig. 1 partly broken away to show the feed bed drive means and means for operating the camera or printer at selective speeds.

Referring more particularly to the drawings wherein like numerals refer to like parts, the device of Fig. 1 includes a housing represented at 10 supporting at its upper portion a combination continuous camera and printer indicated in its entirety by the numeral 12. It will be understood, however, that either a camera or a printer may be employed instead of the combined aparatus illustrated. The lower portion of the housing 10 is provided with a mouth 14 which leads to a series of rollers 16 for the purpose of conveying sheet material across the photographic or printing field 18, the said photographic field being defined by a slotted shield 20 positioned inside the casing 10. The camera or printer 12 is positioned slightly off-center from the field 18 for a reason hereinafter apparent. As best shown in Fig. 4, the upper rollers 16 are idlers and the lower rollers 16 are driven. A fixed plate or floor is provided at this portion of the casing through which the lower rollers 16 project to engage the sheet feed material.

Disposed inside the shield 20 are light sources 22 for the purpose of illuminating manuscripts positioned in the photographic field when the device is positioned in the photographic field. At the exit end of the photographic field and beyond the series of rollers 16 a curved guide member 24 is positioned to receive sheets from the endmost rollers 16 and guide the same into a suitable hopper indicated in dotted lines at 26.

The camera or printer indicated at 12 is provided with conventional film reels 28, film guides 30 for positioning the film in front of a suitable condenser lens system 32 behind which a light source 34 is provided for purposes of printing. It will be understood that the light sources 22 and 34 operate alternatively according to whether the device is used for photographing or printing.

Coming now to the important feature of the invention, a front surfaced mirror 36 is supported at a fixed position inside the casing 10 in position to intercept the line of projection between the sheet material in the field 18 and the film in the camera or printer 12. From the mirror 36, in the case of printing, the line of projection is diverted to a front surfaced mirror 40 positioned in an upper part of the casing, and from the mirror 40 the projection line is directed onto the field area of the bed. The mirror 40 is movably supported in the casing 10 by means of a bracket 42 carrying an opposed gear 43 and rollers 44 engaging opposite sides of a rack 46 which is fixedly supported in the casing by bracket 48. Crank 50 keyed to the gear 43 may be rotated in order to vertically position the mirror 40 along the length of the rack 46. Either or both mirrors 36 and 40 are suitably supported for slight pivotal movement to maintain their complementary action in various relative positions. Also it is understood that the mirror 36 may be mounted for vertical movement in addition to or in lieu of the mirror 40.

While movable mirror 40 is capable of minute adjustment relative to the complementary mirror 36, in ordinary operation the mirror 40 is shifted to one of a plurality of predetermined positions to coordinate the lens reduction ratio with the given gear ratio or operating speed of the camera. For example, the mirror as shown positioned at the top of rack 46 in Fig. 1 to give the maximum throw to complementary mirror 36 is arranged for highest reduction ratio. A selected intermediate position of the mirror 40 is represented diagrammatically in Fig. 2 to provide an intermediate reduction ratio, and in Fig. 2 a mirror 40 is positioned at the calibrated point A indicated intermediate the length of rack 46 in Fig. 1. Fig. 3 is a diagrammatic illustration of the mirror 40 arranged for minimum reduction ratio and in this instance mirror 40 is presumed to be positioned at the calibration indicated at B on the rack 46 in Fig. 1.

Since the degree of magnification of the image as affected by the mirrors 36 and 40 must be compensated for in the camera or printer drive, a variable drive of any suitable character such as illustrated in Fig. 4 is provided. Herein a drive chain 60 is trained over a driven sprocket 62 for advancing the film within the camera or printer 12 and at its other end is adapted to be selectively trained over reduction gears 64, 66 or 68 driven by a motor M. In a convenient manner of manipulation an idler sprocket 70 is adjustably positioned adjacent the chain 60 in order to take up the tension according to the driving gear selected. The motor M also drives the rollers 16 through the sprocket 80 keyed to shaft 82 and a take-off from the shaft 82 drives the sprocket 84 for rotating the reduction gears 64, 66 and 68.

Figure 2:
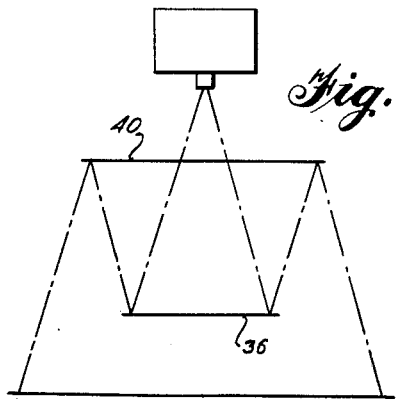
Figs. 2 and 3 are diagrammatic views looking at right angles to Fig. 1 and showing the reflecting mirrors in other different adjusted positions.
Figure 3:
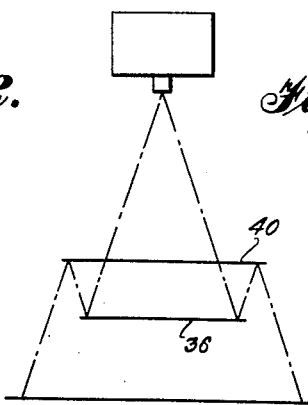

It will be apparent that with the mirror position as shown in Fig. 1 for maximum reduction, the smallest diameter drive sprocket 64 will be employed; that for the intermediate position of the mirrors as shown in Fig. 2 which provides intermediate ratio reduction, the drive sprocket 66 will be used; and that for the mirror position indicated in Fig. 3 which provides minimum ratio reduction, the large drive sprocket 68 will be utilized. The lens of the camera or printer 12 may of course be adjusted to suit the reduction ratio selected.

In the device illustrated the camera or printer 12 and the sheet material conveying means represented by the rollers 16 may be synchronously driven in any suitable manner, a convenient device therefor being disclosed in my copending application Serial No. 358,452, filed September 26, 1940.

It is believed that ordinary operation of the device will be readily apparent from the above description. It is, of course, desirable to photograph at the lowest possible reduction, so that the lowest ratio as exhibited by the mirror position of Fig. 3 will be employed for index cards, bank checks and materials of comparable size in contrast with the highest ratio reduction as shown by the mirror position in Fig. 1 which is particularly adapted for large size blueprints, and engineering drawings, the intermediate ratio being best adapted for material such as newspaper sheets, smaller blueprints, correspondence files, etc.

It is understood that the specific device herein illustrated and described is exemplary only of the principles of the invention as defined in the following claims.

What I claim is:

1. In a device of the character described, a casing having a camera mounted at one end thereof, said camera including; a lens, a film gate, and means for advancing the film through said gate; the optical axis of said lens extending downward vertically toward the other end of said casing, a housing within said casing positioned at the other end thereof and including document advancing means, a source of illumination for throwing an illuminated area on said advancing means to be successively traversed by documents advanced therethrough, a slot formed in said housing in alignment with said illuminated area, the axis of said illuminated area framed by said slot extending vertically within said casing toward said first mentioned end and spaced apart from the axis of said lens, inclined mirror means cutting the axis of said lens and supported near said housing, a support in said casing adjacent to the axis of said illuminated area, and a second inclined mirror means movably carried on said support and cutting the axis of said illuminated area, at least one of said mirror means being supported for slight pivotal movement to maintain complementary action of said mirror means with one another and with both said axes as said movable mirror means is moved to various relative positions on said support, whereby a continuous light path is formed between said illuminated area and said lens for all adjustments of said mirror means.

2. In a device of the character described, a casing having a camera mounted at one end thereof, said camera including; a lens, a film gate and means for advancing the film through said gate; the optical axis of said lens extending toward the other end of said casing, a housing within said casing positioned at said other end and including document advancing means, a source of illumination for throwing an illuminated area on said last advancing means to be successively traversed by documents advanced therethrough, a slot formed in said housing in alignment with and framing said illuminated area; the axis of said framed illuminated area extending longitudinally within said casing and spaced apart from the axis of said lens, inclined mirror means fixedly supported in said casing near said housing and cutting the axis of said lens, a supporting boss on the wall of said casing adjacent to the axis of said framed illuminated area, rack means secured to said support, a mirror support, movably carried on said rack and including a pinion, the teeth of which engage the teeth on said rack, a second inclined mirror means mounted on said mirror support and cutting said second axis, the inclination of said mirrors being such that a continuous path is formed between said slot and said film gate, crank means for rotating said pinion and adjusting said last mirror means along said rack and consequently changing the length of said path, at least one of said mirror means being pivotally mounted on its support and adapted to be adjusted to maintain said continuous path for various adjustments of said second mentioned mirror means, and means for changing the relation of the movement of the film in said camera with respect to the movement of said documents through said advancing means in accordance with the length of said path.

ROBERT PLACE.